(12) United States Patent
Ritchie et al.

(10) Patent No.: US 11,264,740 B2
(45) Date of Patent: Mar. 1, 2022

(54) BATTERY POST TERMINAL ASSEMBLY

(71) Applicant: EMA-US, INC., Huntington Woods, MI (US)

(72) Inventors: Scott Ritchie, Huntington Woods, MI (US); William Olsen, Birmingham, MI (US); Jum Pil Kim, ChoenAn (KR)

(73) Assignee: EMA-US, Inc., Huntington Woods, MI (US)

( * ) Notice: Subject to any disclaimer, the term of this patent is extended or adjusted under 35 U.S.C. 154(b) by 52 days.

(21) Appl. No.: 16/485,155

(22) PCT Filed: Feb. 12, 2018

(86) PCT No.: PCT/US2018/017788
§ 371 (c)(1),
(2) Date: Aug. 10, 2019

(87) PCT Pub. No.: WO2018/148641
PCT Pub. Date: Aug. 16, 2018

(65) Prior Publication Data
US 2020/0014135 A1    Jan. 9, 2020

Related U.S. Application Data

(63) Continuation of application No. 15/429,901, filed on Feb. 10, 2017, now Pat. No. 9,774,110.

(51) Int. Cl.
*H01R 11/28*    (2006.01)
*H01R 4/30*    (2006.01)
(Continued)

(52) U.S. Cl.
CPC ........ *H01R 11/282* (2013.01); *H01M 50/543* (2021.01); *H01R 4/308* (2013.01);
(Continued)

(58) Field of Classification Search
CPC .................................................... H01R 11/282
See application file for complete search history.

(56) References Cited

U.S. PATENT DOCUMENTS 1,645,033 A    10/1927   Witkowski
1,746,514 A    2/1930   Baunach
(Continued)

FOREIGN PATENT DOCUMENTS

CN    202712324 U    8/2012
DE    100 50 217 B4    10/2008
(Continued)

*Primary Examiner* — James Harvey
(74) *Attorney, Agent, or Firm* — Bodman PLC (57) ABSTRACT

A battery post terminal assembly includes a conductive band and a clamp mechanism. The conductive band includes a first free end and a second free end. The conductive band defines an aperture for receiving a battery post of a battery. The clamp mechanism includes a wedge member that defines a recess between a first surface and a second surface thereof. The recess has an open end and a closed end that is narrower than the open end. The first surface is convex. The first free end and the second free end are positioned in the recess. The first free end is movable along the first surface toward the closed end to be moved by the first surface toward the second free end to tighten the conductive band around the battery post.

20 Claims, 7 Drawing Sheets

(51) Int. Cl.
*H01R 4/50* (2006.01)
*H01M 50/543* (2021.01)

(52) U.S. Cl.
CPC ......... *H01R 4/5091* (2013.01); *H01R 11/283* (2013.01); *H01M 2220/20* (2013.01)

(56) References Cited

U.S. PATENT DOCUMENTS

| | | |
|---|---|---|
| 3,116,100 A | 12/1963 | Hunter |
| 5,088,941 A | 2/1992 | Nolle |
| 5,302,142 A | 4/1994 | Tabata |
| 5,302,143 A | 4/1994 | Inoue et al. |
| 5,454,741 A | 10/1995 | Okada |
| 5,547,403 A | 8/1996 | Haberstroh et al. |
| 5,584,730 A | 12/1996 | Tabata |
| 5,595,511 A | 1/1997 | Okada |
| 6,200,173 B1 | 3/2001 | Frisby |
| 9,774,110 B1 * | 9/2017 | Ritchie ............... H01R 11/282 |
| 2006/0003627 A1 | 1/2006 | Freitag |
| 2012/0183845 A1 | 7/2012 | Kawamoto et al. |
| 2015/0147921 A1 | 5/2015 | Noh |
| 2015/0357731 A1 | 12/2015 | Tanigawa et al. |
| 2020/0014135 A1 * | 1/2020 | Ritchie ................. H01R 4/308 |

FOREIGN PATENT DOCUMENTS

| | | |
|---|---|---|
| EP | 0 632 531 A1 | 1/1995 |
| EP | 1180820 A2 | 2/2002 |
| JP | 08222200 | 8/1996 |
| JP | H08222280 A | 8/1996 |
| JP | 2002184389 A | 12/2000 |
| KR | 20090017258 A | 2/2009 |
| WO | 2016080173 A1 | 11/2014 |

\* cited by examiner

BATTERY POST TERMINAL ASSEMBLY

CROSS-REFERENCE TO RELATED APPLICATION(S)

This application is a National Stage of International Application No. PCT/US2018/017788, filed Feb. 12, 2018, which claims priority to and the benefit of U.S. patent application Ser. No. 15/429,901, filed Feb. 10, 2017 (now U.S. Pat. No. 9,774,110), each of which is incorporated by reference herein in its entirety.

TECHNICAL FIELD

This disclosure relates to battery connectors and, in particular, connector assemblies for battery posts.

BACKGROUND

Battery terminal assemblies in automotive applications electrically couple a vehicle battery to various electrical systems. More particularly, battery terminal assemblies are configured to couple to battery posts (e.g., positive and negative battery posts). However, battery posts of different batteries may vary widely vary in shape despite being configured according to a common specification. For example, battery posts having a 9:1 taper may require only having specific upper and lower diameters, while varying greatly in regions therebetween (e.g., angle, surface profiles, etc.) and still meeting design specifications. Furthermore, while battery terminals are typically tightened using horizontal drive mechanisms (e.g., a screw extending perpendicular to an axis of the battery post), such horizontal drive mechanisms may be ergonomically disadvantageous in automotive assembly line environments. It would, therefore, be advantageous to provide a battery terminal assembly that reliably couples to battery posts of varied shapes and that employs an alternative drive mechanism.

SUMMARY

Disclosed herein are implementations of a battery post terminal assembly. In one implementation, a battery post terminal assembly includes a conductive band and a clamp mechanism. The conductive band includes a first free end and a second free end. The conductive band defines an aperture for receiving a battery post of a battery. The clamp mechanism includes a wedge member that defines a recess between a first surface and a second surface thereof. The recess has an open end and a closed end that is narrower than the open end. The first surface is convex. The first free end and the second free end are positioned in the recess. The first free end is movable along the first surface toward the closed end to be moved by the first surface toward the second free end to tighten the conductive band around the battery post.

In another implementation, a battery post terminal assembly includes a conductive member and a coupling mechanism. The conductive member forms an aperture to receive a battery post of a battery. The conductive member includes a first free end and a second free end spaced apart by a gap. The coupling mechanism includes a wedge member, a threaded post coupled to the wedge member, a nut threadably attached to the threaded post, and a spacer member slidably received on the threaded post. The wedge member defines a sloped recess in which the first free end and the second free end of the conductive member are received. The spacer member is drivable by the nut along the threaded post to press the first end and the second end of the conductive member into the sloped recess to reduce the gap. The spacer member is permitted to tilt relative to the threaded post.

In a further implementation, a battery post terminal assembly includes a battery post attachment portion, a drive portion, and a lead attachment portion. The battery post attachment portion is tightenable around a battery post of a battery. The drive portion tightens the battery post attachment portion using a U-shaped wedge member having convex surfaces that face each other and a tiltable drive member. The lead attachment portion is coupled to the battery post attachment portion and is connectable to an electrical lead.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
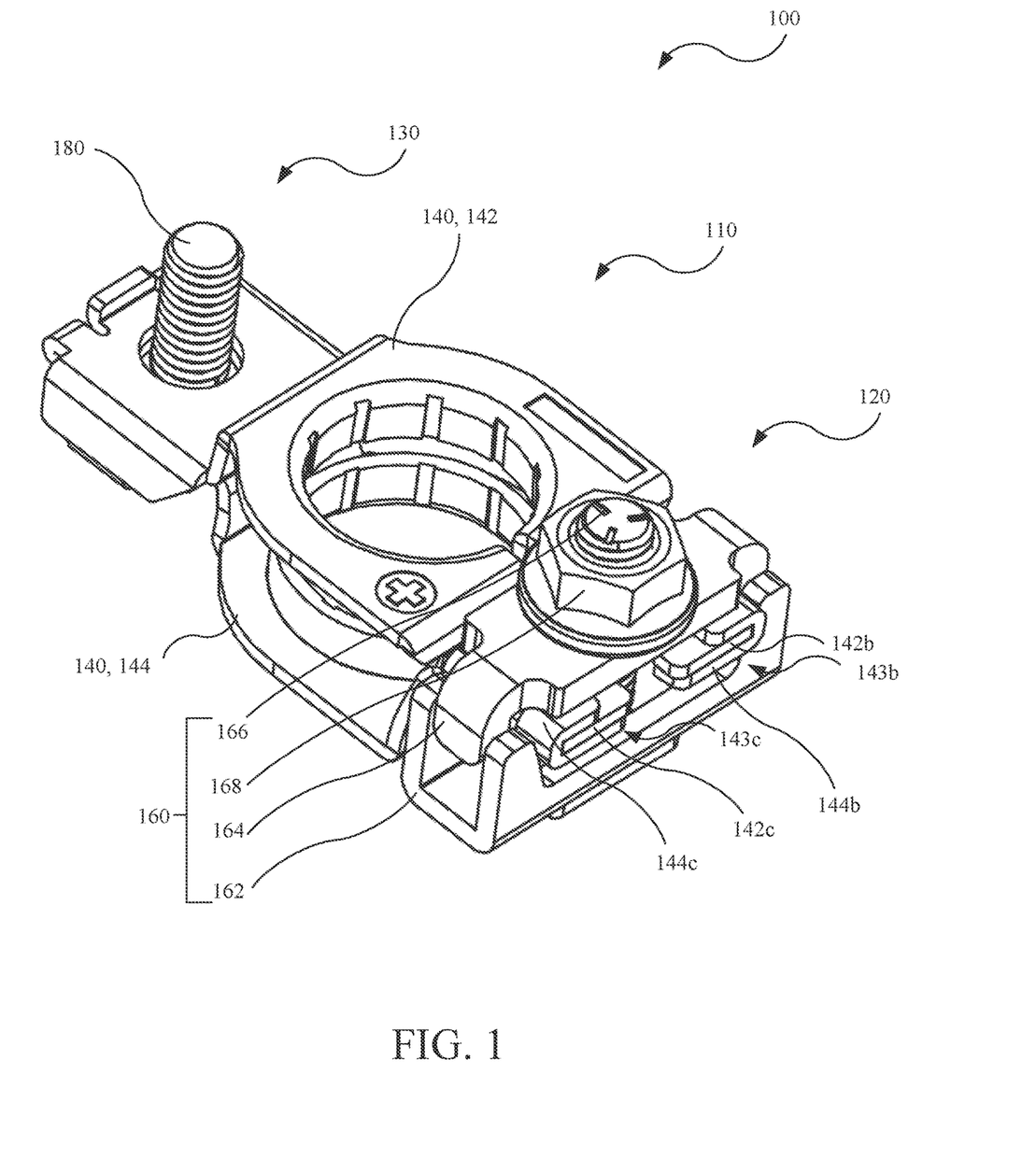
FIG. 1 is an upper, front, left perspective view of an embodiment of a battery post terminal assembly.
Figure 2:
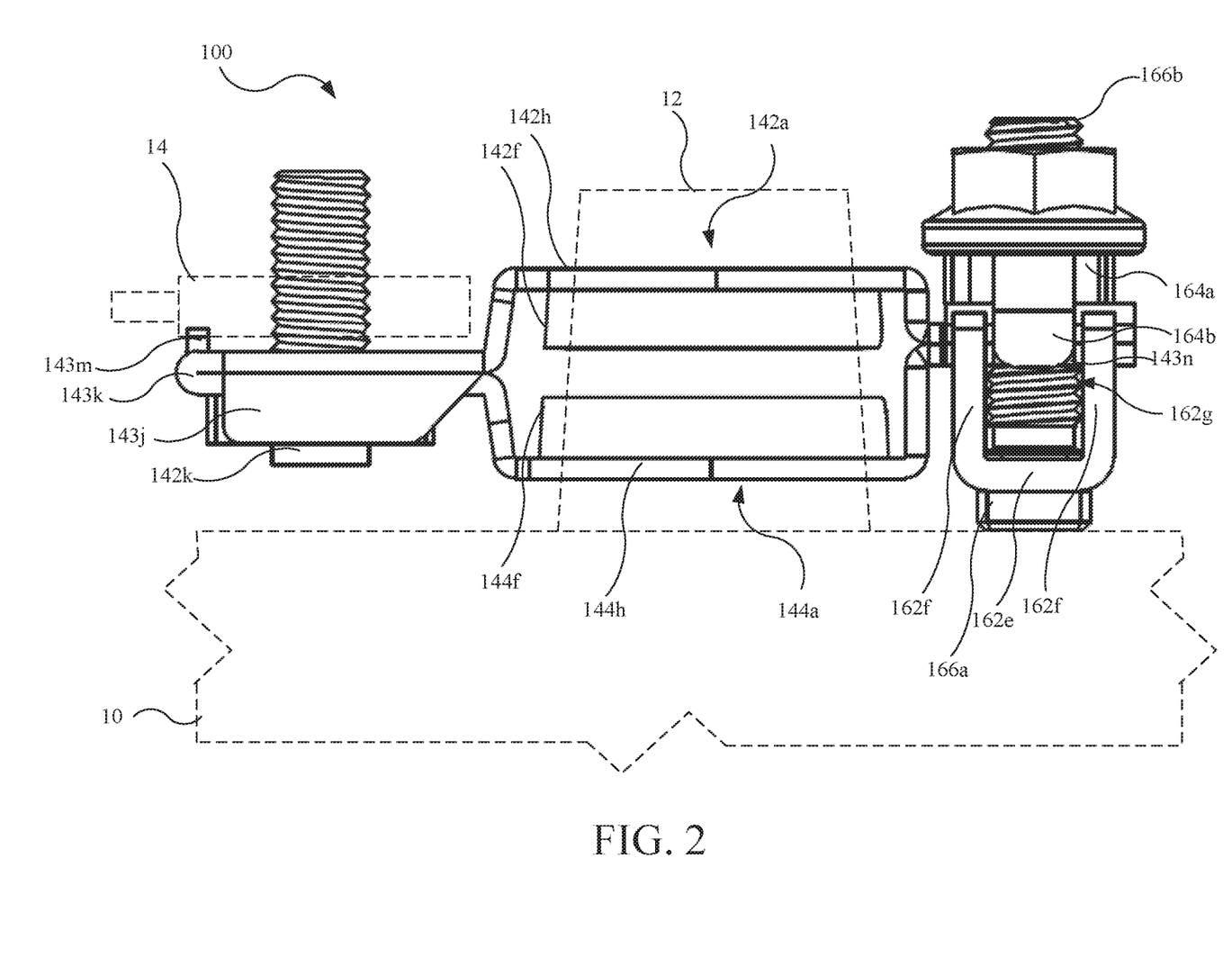
FIG. 2 is a left side elevation view of the battery post terminal assembly of FIG. 1 with portions of a battery shown in phantom.

As shown in FIGS. 1-6, a battery post terminal assembly 100 (e.g., terminal assembly or unit) is configured to couple to a battery post 12 (e.g., terminal) of a battery 10 (shown in FIG. 2 in dashed lines). The terminal assembly 100 additionally provides a lead attachment post 180 (e.g., stud) for combined physical attachment and electrical coupling of an electrical lead 14 (e.g., wire) to the terminal assembly 100 and, ultimately, the battery post 12 of the battery 10. As discussed in further detail below, the terminal assembly 100 is configured to conform to the battery post 12, which may vary in shape between different batteries 10, while providing high coupling strength and durability. Furthermore, the terminal assembly 100 is configured to be coupled to the battery post 12 using a vertical drive (e.g., vertically-arranged rotational driver), which may provide ergonomic advantages for attachment in assembly line environments. The battery post terminal assembly 100 may be considered modular by providing a lead attachment post 180 that may be coupled to any suitable electrical lead 14, as opposed to being a permanently affixed to a wire lead.

As shown in FIG. 1, the terminal assembly 100 generally includes a battery attachment portion 110 (e.g., battery post or central portion, region, or segment), a drive portion 120 (e.g., clamping or front end region, segment, or subassembly), and a lead attachment portion 130 (e.g., electrical coupling or rear end region, segment, or subassembly). The battery attachment portion 110 is configured to receive and be coupled the battery post 12 of the battery 10. The drive portion 120 is configured to secure the battery attachment portion 110 to the battery post 12 of the battery 10. The lead attachment portion 130 is configured to couple to the electrical lead 14, which may in turn be coupled to one or more systems of a vehicle (e.g., starter, alternator, and various electrically controlled and/or powered systems of the vehicle, such as powertrain control modules, infotainment systems, etc.).

The terminal assembly 100 generally includes a body member 140 (e.g., terminal, terminal body, conductive or band member, structure, stamping, etc.), a clamp mechanism 160 (e.g., clamp or coupling mechanism or assembly), and a lead attachment post 180 (e.g., stud). The body member 140 forms the battery attachment portion 110 in a central region; the body member 140 and the clamp mechanism 160 cooperatively form the drive portion 120; and, the body member 140 and the lead attachment post 180 cooperatively form the lead attachment portion 130. The battery attachment portion 110 is positioned between the drive portion 120 and the lead attachment portion 130 of the terminal assembly 100.

The body member 140 forms the battery attachment portion 110 and is configured to receive the battery post 12 therein, while the clamp mechanism 160 is operable to tighten the body member 140 circumferentially around the battery post 12. The body member 140 is a stamped and formed component made of brass (e.g., tin-plated), copper, or other suitable material.

Figure 3:
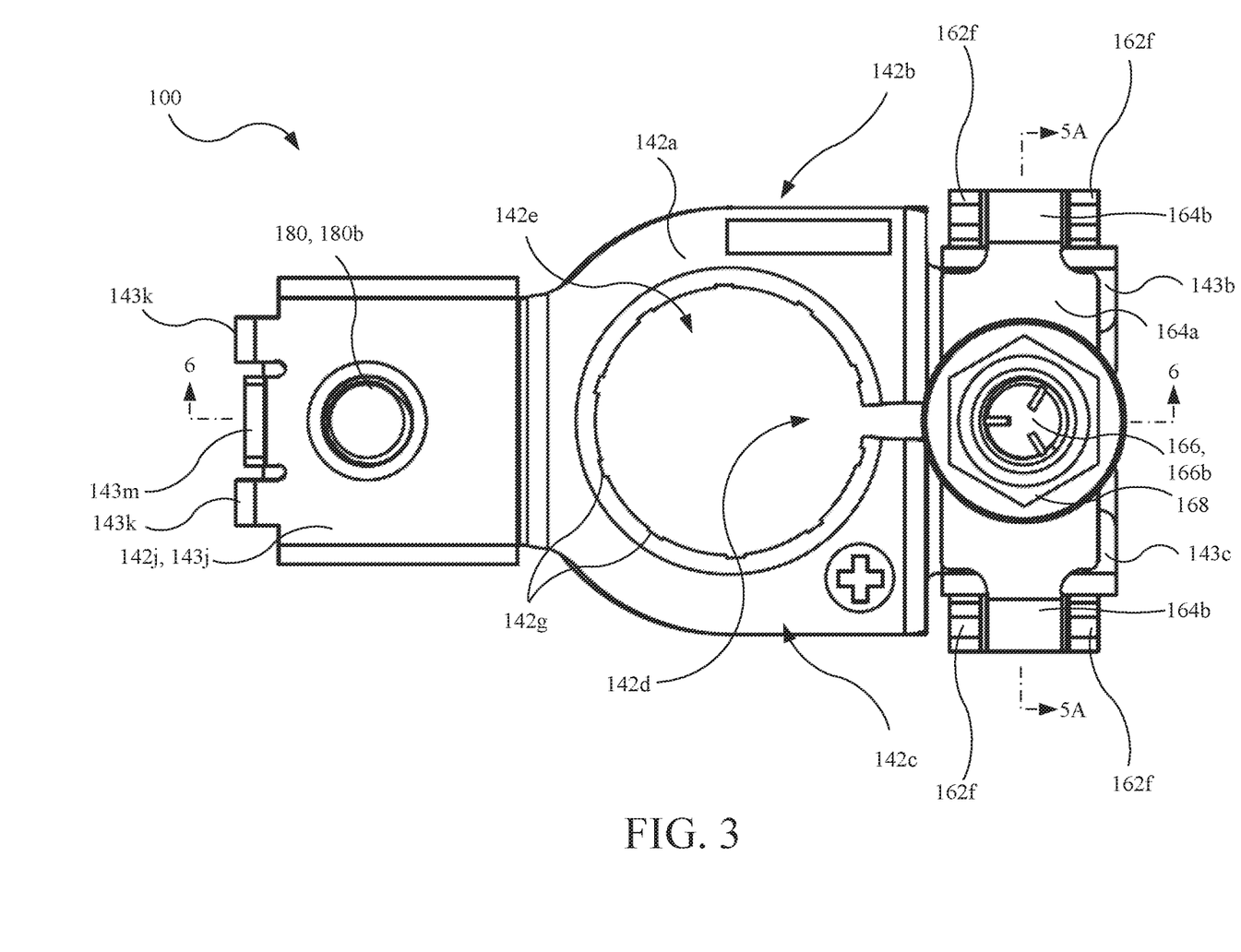
FIG. 3 is a top plan view of the battery post terminal assembly of FIG. 1.
Figure 4:
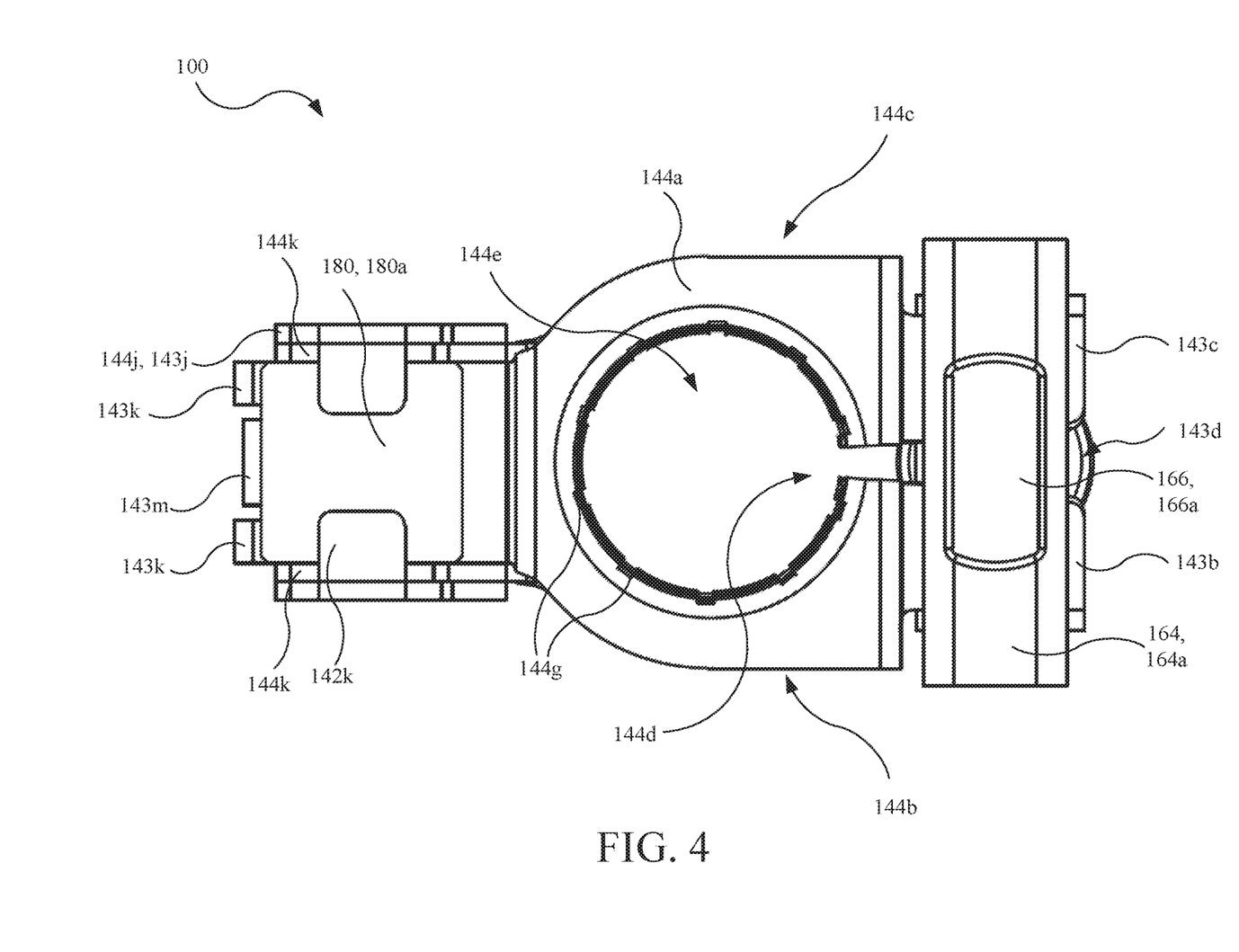
FIG. 4 is a bottom plan view of the battery post terminal assembly of FIG. 1.

The body member 140 includes an upper portion 142 and a lower portion 144. Referring to FIGS. 2-4, in the battery attachment portion 110, the upper portion 142 and the lower portion 144 of the body member 140 form an upper band 142a (e.g., first or upper conductive band) and a lower band 144a (e.g., second or lower conductive band), respectively. The upper band 142a and the lower band 144a are configured to receive (e.g., substantially circumscribe) the battery post 12 and tighten therearound, so as to couple the terminal assembly 100 to the battery post 12. The upper band 142a is spaced apart from the lower band 144a with a vertical gap therebetween. The upper and lower bands 142a, 144a, by being spaced apart and physically separated from each other, may independently conform and, thereby, more securely couple to battery posts 12 of irregular shapes. Battery posts 12 of different batteries may each be configured with a standard 9:1 taper, but may vary significantly between upper and lower ends thereof, while still conforming to specifications (e.g., industry standards). Battery posts 12 may vary, for example, by having a skew axis, irregular or curved peripheral surface, and/or different surface textures. Furthermore, battery posts 12 are typically made of a relatively soft metal (e.g., lead), which can further vary in shape after being in service (e.g., metal of the post flowing when attached to a terminal and/or removal of material during cleaning). Variations of the terminal assembly 100 described herein may include only a single band (e.g., having the clamp mechanism 160 but different body member 140).

Referring to FIG. 3, the upper band 142a of the body member includes a first side 142b (e.g., right side, member, or segment) and a second side 142c (e.g., left side, member, or segment) that are separated by a gap 142d (e.g., space) and which cooperatively define an upper aperture 142e (e.g., substantially circular aperture, receptacle, or hole). The upper aperture 142e is sized so as to receive the battery post 12 therein and for the upper band 142a to be tightened therearound. More particularly, the first side 142b and the second side 142c of the upper band 142a are movable toward each other in a substantially tangential direction relative to the battery post 12, so as to reduce the size of the upper aperture 142e (e.g., reduce in circumference) and tighten around the battery post 12.

Referring again to FIG. 2, the upper band 142a includes an upper annular flange 142f (e.g., segment), which extends in an axial direction. The upper annular flange 142f forms an inner surface of the upper aperture 142e, which engages the battery post 12. The upper annular flange 142f may also include one or more axially extending slots 142g (e.g., recesses; shown in FIG. 3) that are radially recessed into the upper annular flange 142f. Material of the battery post 12 may flow into the slots 142g when and/or after the upper band 142a is tightened around the battery post 12, which mechanically resists rotation of the terminal assembly 100 relative to the battery post 12.

The upper band 142a may additionally include an upper segment 142h. The upper segment 142h may be substantially planar (e.g., horizontal) with the upper annular flange 142f protruding axially downward therefrom. The upper annular flange 142f and upper aperture 142e may, for example, be formed during one or more stamping operations.

Referring to FIGS. 2 and 4, the lower band 144a of the body member 140 is configured similarly to the upper band 142a. Features of the lower band 144a, which are similar to those of the upper band 142a, are referred to with like suffixes (e.g., a first side 144b of the lower band 144a is similar to the first side 142b of the upper band 142a). Similar to the upper band 142a, the lower band 144a includes the first side 144b and a second side 144c, which are separated by a gap 144d and which cooperatively define a lower aperture 144e. The lower band 144a also includes a lower annular flange 144f that engages the battery post 12 at a location below the upper annular flange 142f and that may include slots 144g. The lower band 144a may also include a lower segment 144h from which the lower annular flange 144f protrudes axially upward therefrom. The upper annular flange 142f and the lower annular flange 144f may, individually and/or cooperatively, be configured complementary in shape to the battery post 12 of a standard design (e.g., a positive or negative battery post 12 having a 9:1 taper). It should be noted that a set (e.g., pair) of terminal assemblies 100 may be configured with different sizes (e.g., diameters), such that each terminal assembly 100 of the pair (e.g., the positive and negative terminal assemblies 100) corresponds to a standard size for positive and negative battery posts 12.

An inner surface upper annular flange 142f has a 9:1 taper, or other taper, which matches that specified for the battery post 12. As a result, when the upper band 142a is tightened around the battery post 12, contact area between the upper annular flange 142f of the upper band 142a and an outer surface of the battery post 12 may be maximized. Furthermore, by matching the 9:1 taper of the battery post 12, the inner surface of the upper annular flange 142f is configured to tighten substantially uniformly to the battery post 12 (e.g., circumferentially around the battery post 12 and axially along a height of the upper annular flange 142f). By maximizing contact area of the upper annular flange 142f and/or by tightening the annular flange 142f substantially uniformly to the battery post 12, retention and prevention of relative movement (e.g., rotational and/or axial) between the terminal assembly 100 and the battery post 100 may be improved. Alternatively, the upper annular flange 142f may be configured for a lower end (e.g., edge) thereof to first engage and/or tighten to the battery post 12 with upper portions of the upper annular flange 142*f* later engaging and/or tightening to the battery post 12 (e.g., as the battery post 12 and/or the upper band 142*a* conform to each other).

An inner surface lower annular flange 144*f* may also have a 9:1 taper, or other taper, which matches that specified for the battery post 12. As a result, when the lower band 144*a* is tightened around the battery post 12, contact area between the lower annular flange 144*f* of the lower band 144*a* and an outer surface of the battery post 12 may be maximized. Furthermore, by matching the 9:1 taper of the battery post 12, the inner surface of the lower annular flange 144*f* is configured to tighten substantially uniformly to the battery post 12 (e.g., circumferentially around the battery post 12 and axially along a height of the lower annular flange 144*f*). By maximizing contact area of the lower annular flange 144*f* and/or by tightening the lower annular flange 144*f* substantially uniformly to the battery post 12, retention and prevention of relative movement (e.g., rotational and/or axial) between the terminal assembly 100 and the battery post 100 may be improved. Alternatively, the lower annular flange 144*f* may be configured for an upper end (e.g., edge) thereof to first engage and/or tighten to the battery post 12 with lower portions of the lower annular flange 144*f* later engaging and/or tightening to the battery post 12 (e.g., as the battery post 12 and/or the lower band 144*a* conform to each other).

Still further, the upper annular flange 142*f* of the and the lower annular flange 144*f* of the lower band 144*a* may be configured with a cooperative (e.g., continuous) 9:1 taper, or other taper, which matches that specified for the battery post 12. For example, the lower aperture 144*e* may be larger in diameter than the upper aperture 142*e* to account for the tapered shape of the battery post 12 referenced above. By individually and cooperatively forming the 9:1 taper, the upper annular flange 142*f* of the upper band 142*a* and the lower annular flange 144*f* of the lower band 144*a* are configured to tighten substantially uniformly to the battery post 12 (e.g., tightening and/or engaging substantially simultaneously and at similar rates). Alternatively, the upper annular flange 142*f* may be configured to engage and/or tighten around the battery post 12 in serial manner (e.g., the upper annular flange 142*f* first engaging and/or tightening to the battery post 12 with the lower annular flange 144*f* later engaging and/or tightening to the battery post 12).

As referenced above, different battery posts 12 of different batteries, while being manufactured to a common specification, may vary in shape and/or surface finish. Misalignment may also occur between the body member 110 of the terminal assembly and the battery post 12. Despite this variation in the battery posts 12 and misalignment with the terminal assemblies 110, reliable connections between any given battery post 12 and the terminal assembly 100 may still be achieved, for example, by the battery post 12 conforming to the terminal assembly 100 and/or the upper band 142*a* and/or lower band 144*a* of the terminal assembly 100 conforming to the battery post 12, as discussed in further detail below.

As discussed in further detail below, the body member 140 includes a first free end 143*b* and a second free end 143*c* that are pressed toward each other by the clamp mechanism 160, so as to tighten the upper band 142*a* and the lower band 144*a* to the battery post 12.

The first side 142*b* and the second side 142*c* of the upper band 142*a* are continuous with each other at an end of the body member 140 proximate the attachment post 180. Similarly, the first side 144*b* and the second side 144*c* of the lower band 144*c* are continuous with each other at the end of the body member 140 proximate the attachment post 180.

Figure 5A:
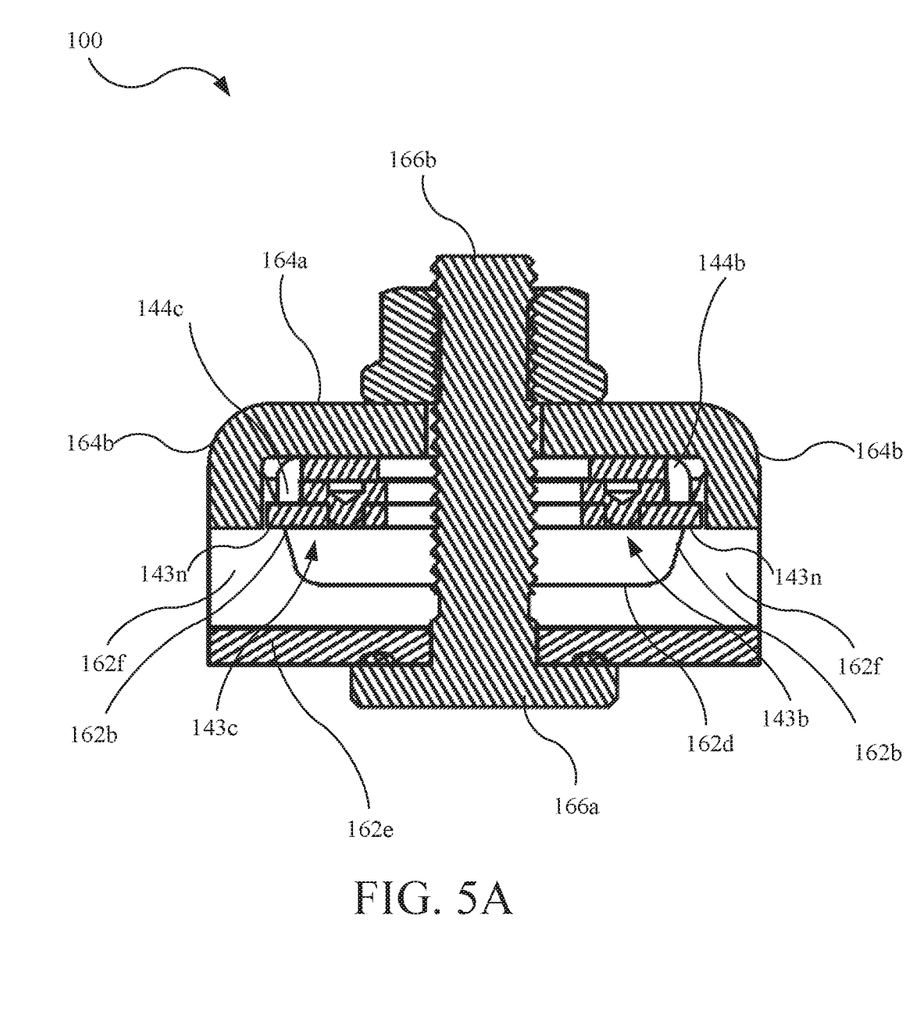
FIG. 5A is cross-sectional view of the battery post terminal assembly taken along line 5A-5A in FIG. 3.
Figure 5B:
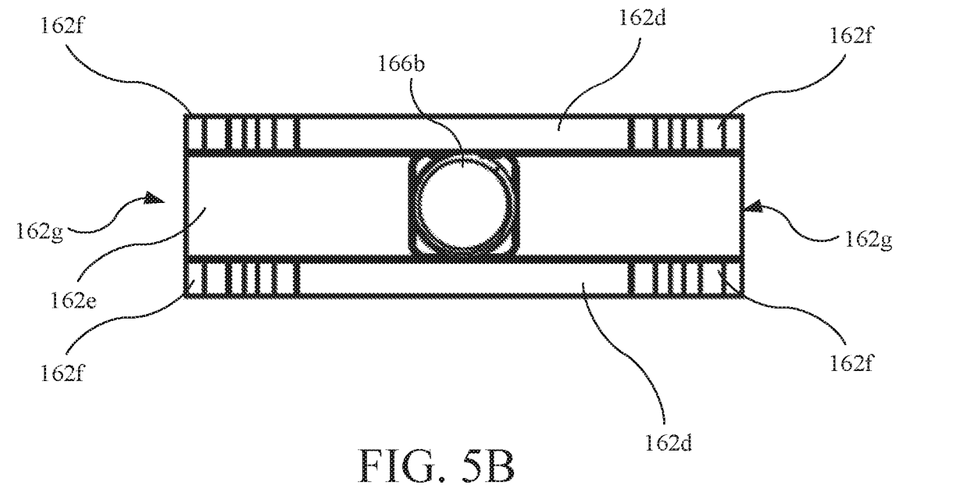
FIG. 5B is a top view of a wedge member of the battery post terminal assembly shown in FIG. 1.
Figure 5C:
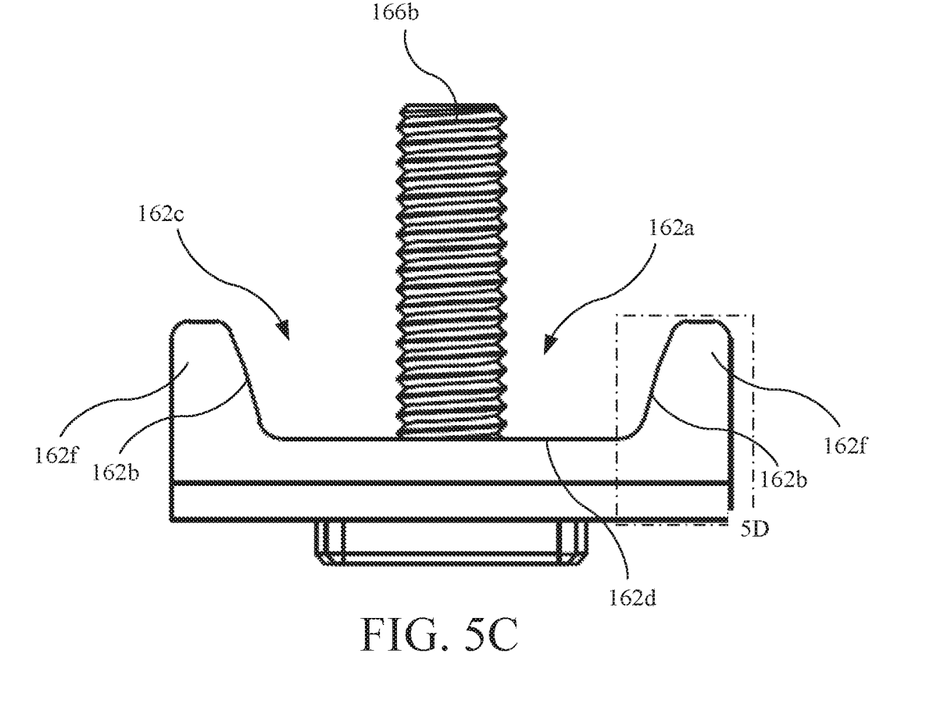
FIG. 5C is a front view of the wedge member shown in FIG. 5B.

At another end of the body member 140 proximate the clamp mechanism 160, the first side 142*b* and the second side 142*c* of the upper band 142*a* are independent of each other (e.g., may move freely or independent of each other), as are the first side 144*b* and the second side 144*c* of the upper band 144*a* independent of each other. Furthermore, the first side 142*b* of the upper band 142*a* are coupled to the first side 144*b* of the lower band 144*a* to form the first free end 143*b* (e.g., first or right end, combined end, or free end) of the body member 140. For example, as shown in FIGS. 1 and 5A, an end portion of the first side 144*b* of the lower band 144*a* may be folded around the outside of another end portion of the first side 142*b* of the upper band 142*a* to form the first free end 143*b*. The first free end 143*b* is substantially planar (e.g., includes end portions of the first sides 142*b*, 144*b* of the upper and lower bands 142*a*, 144*a* that are substantially planar) and may also be nominally horizontal (i.e., before being pressed by the clamp mechanism 160). Similarly, the second side 142*c* of the upper band 142*a* is coupled to the second side 144*c* of the lower band 144*a* to form the second free end 143*c* (e.g., second or left end, combined end, or free end) of the body member 140. An end portion of the second side 144*c* of the lower band 144*a* may be folded around the outside of another end portion of the second side 142*c* of the upper band 142*a* to form the second free end 143*c*. The second free end 143*c* may also be substantially planar and/or nominally horizontal (e.g., with end portions of the second sides 142*c*, 144*c* of the upper and lower bands 142*a*, 144*a* that are substantially planar and/or nominally horizontal). Alternatively, the end portions of the lower band 144*a* may be folded around the inside of the end portions of the upper band 142*a*, and/or the end portions of the upper band 142*a* may be folded around the inside and/or the outside of the end portions of the lower band 144*a*.

As shown in FIG. 2, the first free end 143*b* and the second free end 143*c* are positioned vertically between the upper segment 142*h* and the lower segment 144*h* of the upper and lower bands 142*a*, 144*a*. For example, the end portions of the upper and lower bands 142*a*, 144*a* may include substantially vertical segments between the upper and lower apertures 142*e*, 144*e* and the clamp mechanism 160, which may also function to prevent rotation of the clamp mechanism 160 relative to the body member 140.

The first free end 143*b* and the second free end 143*c* may additionally include protrusions 143*n* that extend from outer edges thereof. The protrusions 143*n* may, for example, function to locate the body member 140 relative to the clamp mechanism 160 (as discussed in further detail below). The protrusions 143*n* may, for example, be formed by the lower portion 144 of the body member 140.

As shown in FIG. 4, a gap 143*d* between the first free end 143*b* and the second free end 143*c*. The gap 143*d* extends from the gaps 142*d*, 144*d* between the upper band 142*a* and the lower band 144*a*. The gap 143*d* additionally includes an aperture (not shown; or widened region) to slidably receive a threaded stud 166 (e.g., threaded post or bolt) of the clamp mechanism 160 (discussed below) in an axial direction. The gap 143*d*, however, has a maximum width on either side of the stud 166 that is less than a diameter of the stud 166, so as to prevent removal of the stud 166 in a radial direction.

Referring generally to FIGS. 1-6, the clamp mechanism 160 and the free ends 143*b*, 143*c* cooperatively form the drive portion 120 of the terminal assembly 100. As referenced above, the clamp mechanism 160 is configured to tighten the upper band 142a and the lower band 144a around the battery post 12, so as to couple the terminal assembly 100 to the battery post 12. The clamp mechanism 160 receives the first free end 143b and the second free end 143c of the body member 140, so as to simultaneously tighten the upper band 142a and the lower band 144a around the battery post 12.

The clamp mechanism 160 generally includes a wedge member 162 (e.g., wedge, clamp, or ramp member or structure), a spacer member 164 (e.g., spacer, drive, press, or load spreading member, spacer, washer, bearing, or structure), a threaded stud 166 (e.g., bolt), and a nut 168. The wedge member 162 is a U-shaped structure that defines a recess 162a having one or more opposed ramped surfaces 162b (e.g., forming a sloped recess; see FIGS. 1 and 5). The ramped surfaces 162b extend from a relatively wide open end 162c to a relatively narrow closed end 162d of the recess 162a. The spacer member 164, being driven by the nut 168 along the threaded stud 166, presses the first free end 143b and the second free end 143c of the body member 140 (e.g., presses uniformly, such as with uniform force) into the recess 162a from the open end 162c toward the closed end 162d along the ramped surfaces 162b. The ramped surfaces 162b simultaneously press the first free end 143b and the second free end 143c of the body member 140 toward each other (e.g., in a tangential direction) so as to close the gaps 142d, 143d, 144d and tighten the upper and lower bands 142a, 144a around the battery post 12. For example, those end portions of the first and second sides 144b, 144c of the lower band 144a that are folded around the outside of end portions of the first and second sides 142b, 142c of the upper band 142a also engage and slide downward along the ramped surfaces 162b. Further detail of the wedge member 162, the spacer member 164, the threaded stud 166, and the nut 168 are discussed in further detail below.

Figure 5D:
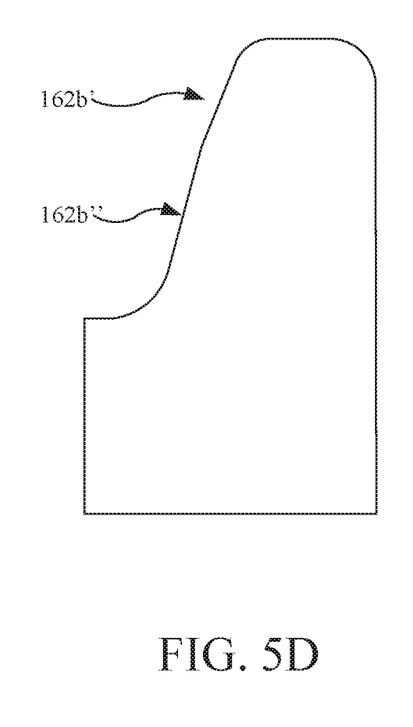
FIG. 5D is a detail view taken from box 5D in FIG. 5C.
Figure 6:
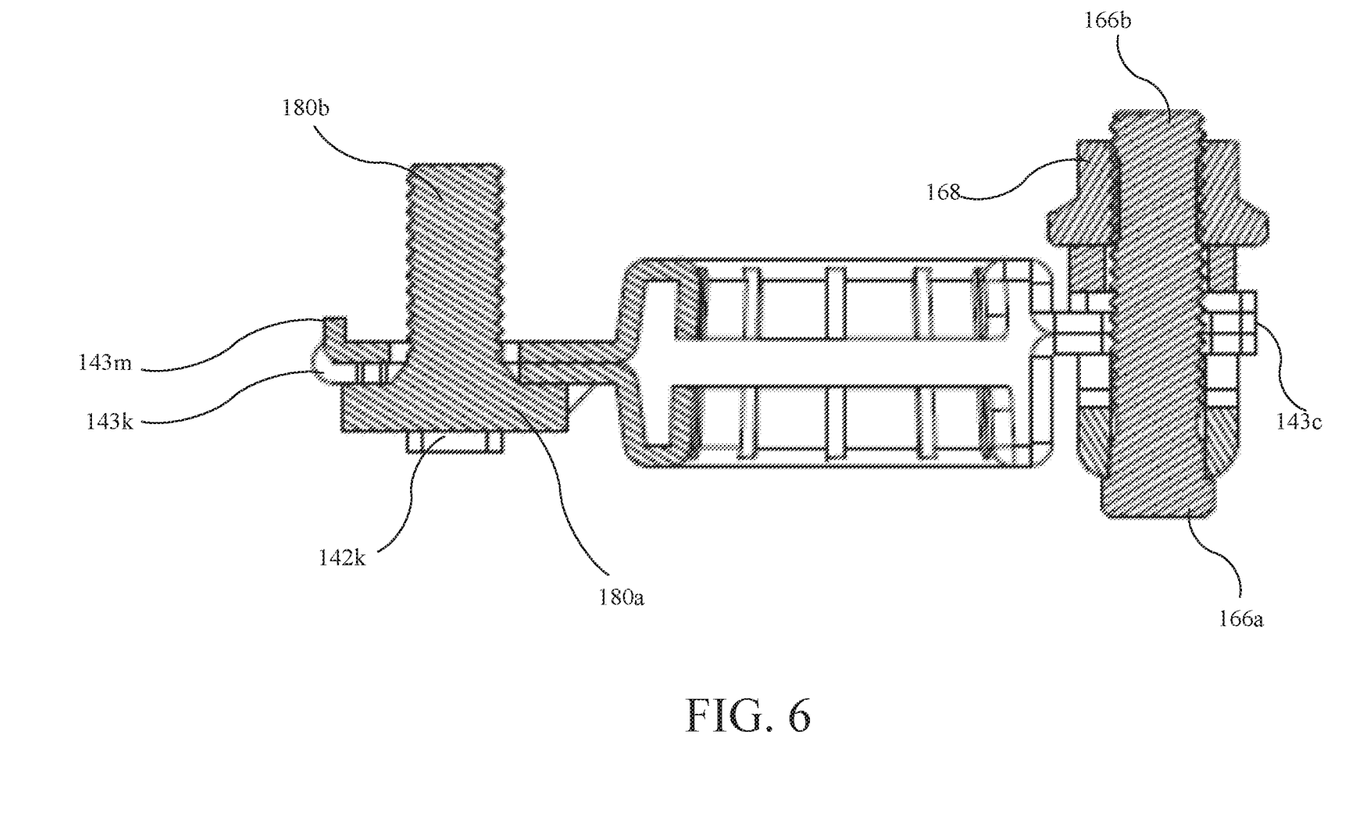
FIG. 6 is a cross-sectional view of the battery post terminal assembly taken along line 6-6 in FIG. 3.

The wedge member 162 of the clamp mechanism 160 is a unitary component, for example, a stamped and formed steel component (e.g., plated steel, such as nickel zinc plating). The wedge member 162 may, alternatively, be made from different materials and/or manufacturing methods (e.g., forged, machined, liquid injected metals, etc.). The wedge member 162 includes a base portion 162e (e.g., base or bottom) and two flange portions 162f (e.g., first and second flanges or extensions). The base portion 162e is substantially planar. The two flange portions 162f are also substantially planar and extend from sides of the base 162e substantially parallel with each other (e.g., at approximately 90 degrees relative to the base 162e). The flange portions 162f are spaced apart to form a gap 162g (e.g., channel or slot) therebetween. The protrusions 143n of the first free end 143b, 143c of the body member 140 may be received within the gap 162g, so as to locate and/or retain the wedge member 162 relative to the body member 140. Each flange portion 162f includes one set (e.g., pair) of opposed ramped surfaces 162b (e.g., forming four ramped surfaces 162b), which define the recess 162a therebetween, as well as the open end 162c and the closed end 162d of the recess 162a. The flange portions 162f may be considered to form individual recesses 162a or to cooperatively form the recess 162a extending between across the flange portion 162f. As shown in FIG. 5D, each ramped surface 162b has a convex profile extending from the open end 162c to the closed end 162d of the recess 162a. More particularly, the ramped surface 162b becomes steeper moving toward the closed end 162d of the recess 162a. That is, the ramped surface 162b has a greater angle of inclination (e.g., steeper angle) nearer the closed end 162d than the open end 162c of the recess 162a with the angle of inclination being measured relative to a plane perpendicular to the direction of insertion of the ends 143b, 143c of the body member 140 into the recess 162a (e.g., parallel with the shaft 166b). The lesser angle of inclination at the open end 162c, for example, initially at least partially closes the gaps 142d, 143d, 144d, while the greater angle of inclination may secure the upper and lower bands 142a, 144a around the battery post 12. A transition between the Assuming a constant rotational speed of the nut 168, the convex profile of the ramped surfaces 162b also results in the gap 143d being closed more rapidly initially (e.g., for initially bringing the free ends 143b, 143c closer together) as the nut 168 is tightened and less rapidly later (e.g., for shoring the body member 140 to the battery post 12). The ramped surfaces 162b may be the same (e.g., mirrored repeated) on each side of the recess 162a and on each side of the gap 162g (i.e., resulting in four ramped surfaces 162b having the same shape).

More particularly, the convex profile of the ramped surface 162b may have a first ramped region 162b' (e.g., upper region) that extends straight with a lesser angle of inclination near the open end of the recess 162a, and a second ramped region 162b'' (e.g., lower region) that extends straight with a greater angle of inclination near the closed end of the recess 162a. For example, the angle of inclination of the first ramped region 162b' may be between 2 and 15 degrees less than that of the second ramped region 162b'' (e.g., between 4 and 8 degrees, such as approximately 5 degrees). The angle of inclination of the first ramped region 162b' may be between approximately 60 and 75 degrees, such as between approximately 67 and 72 degrees (e.g., approximately 69 degrees). The angle of inclination of the second ramped region 162b'' may be between approximately 65 and 80 degrees, such as between approximately 72 and 77 degrees (e.g., approximately 74 degrees). The ramped surfaces 162b may include a gradual (e.g., curved) transition between the first ramped region 162b' and the second ramped region 162b''.

The threaded stud 166 is coupled to the base portion 162e of the wedge member 162. The threaded stud 166 may, for example, be steel (e.g., plated steel, such as with nickel zinc plating). The threaded stud 166 generally includes a head 166a (e.g., head portion) and a threaded shaft 166b (e.g., shaft portion). The threaded shaft 166b extends through an aperture (not labeled) that is centrally located in the base 162e (e.g., approximately midway between the flange portions 162f and midway between the ramped surfaces 162b thereof). The head 166a bears against a surface of the base 162e facing opposite the direction (e.g., downward) in which the flange portions 162f extend away (e.g., upward) from the base 162e. The head 166a may be elongated, so as to extend along and bear against the surface of the base 162e. By being elongated, the head 166a may bear against a larger area of the surface of the base 162e than if square or circular, while also maintaining a relatively narrow width to accommodate different clearances between the battery post 12 and adjacent structures of different batteries 10. For example, the head 166a may have a length that is longer than its width, which are less than a length and width of the wedge member 162.

The head 166a may also be coupled (e.g., welded or adhered) to the base 162e, which prevents rotation therebetween and also uses the head 166a to strengthen the wedge member 162 against bending (e.g., as the free ends 143b, 143c are pressed against the ramped surfaced 162b) and, thereby, may improve clamping or holding strength of the terminal assembly 100. Alternatively, the head 166a may be received in a recess of the base 162e of the wedge member 162, which mechanically prevents rotation of the threaded stud 166 relative to the wedge member 162. The threaded shaft 166b extends upward (e.g., substantially parallel with the battery post 12) is configured to threadably receive the nut 168 (e.g., steel, such as plated steel with a nickel zinc plating) thereon (e.g., is driven vertically).

The spacer member 164 is configured to press the first free end 143b and the second free end 143c of the body member 140 into the recess 162a of the wedge member 162. More particularly, the spacer member 164 is received on the threaded shaft 166b of the threaded stud 166 and is moved axially along the shaft 166b by the nut 168. The spacer member 164 spans across the free ends 143b, 143c of the body member 140.

The spacer member 164 is also able to tilt relative to the shaft 166b (e.g., is a tiltable drive member), such that the base portion 164a is not perpendicular to the shaft 166b. For example, by receiving the shaft 166b in an aperture of the spacer member 164 that is larger than a diameter of the shaft 166b, the clearance between the spacer member 164 and the shaft 166b allows the spacer member 164 to tilt. By allowing the spacer member 164 to tilt relative to the shaft 166b, the spacer member 164 may uniformly press (e.g., apply substantially equal axial force) to the free ends 143b, 143c of body member 140. This allows terminal assemblies 100 of a single design to be better able to tighten the upper and lower bands 142a, 144a to the battery posts 12 of different batteries 10 despite irregular shapes of these battery posts 12.

More particularly, irregularity (e.g., aberrations, such as irregular shape, size, and/or surface texture) of battery posts 12 and/or misalignment between the body member 140 and the battery post 12 may cause movement between the wedge member 162 and the body member 140. These irregularities and/or misalignment may, for example, cause the body member 140 and the wedge member 162 to tilt relative to each other. Furthermore, these irregularities and/or misalignment may cause the upper band 142a and the lower band 144a and/or the first sides 142b, 144b, and the second sides 142c, 144c to engage the battery post 12 in different manners (e.g., with forces at different magnitudes, heights, and/or sides). This unequal engagement can result in unequal movement the free ends 143b, 143c of the body member 140 relative to the wedge member 162. By allowing the spacer member 164 to tilt relative to the wedge member 162 (including the shaft 166b), the spacer member 164 can more uniformly press against the free ends 143b, 143c (e.g., apply a more uniform force), which results in more uniform engagement (e.g., vertically and/or circumferentially) of the upper band 142a and the lower band 144a with the battery post 12. As the nut 168 is driven on the post 166b, so as to drive the spacer member 164 downward closer to the wedge member 162, the body member 140 and the wedge member 162 may be brought closer into alignment (e.g., with the wedge member 162 being aligned in a plane that is parallel to a plane extending through the free ends 143b, 143c and/or a plane defined by the upper segment 142h of the upper band 142a) despite the aforementioned irregularities and/or misalignment.

For example, as the first free end 143b and the second free end 143c are driven into the recess 162a along the sloped surfaces 162b, the first sides 142b, 144b and the second sides 142c, 144c of the upper and lower bands 142a, 144a may engage and couple (e.g., bind or lock) to the battery post 12 at different heights. As a result, the first free end 143b and the second free end 143c of the body member 140 are similarly positioned at different heights within the recess 162a but remain engaged by the spacer member 164. In contrast, if a member (e.g., a nut) were to remain in fixed angular relationship to the wedge member 162, such a member may not uniformly engage both free ends 143b, 143c of the body member 140, which could result in less uniform tightening (e.g., contact area and/or force) between the upper band 142a and the lower band 144a (e.g., vertical and/or left-to-right) and, thereby, poorer retention and/or prevention of relative movement between the terminal assembly 100 and the battery post 12.

The spacer member 164 is a unitary member, for example, a stamped steel component (e.g., plated steel, such as with nickel zinc plating). The spacer member 164 includes a base portion 164a (e.g., central portion or region) and may additionally include two flanges 164b (e.g., flange portions or segments). The base portion 164a is substantially planar and includes a central aperture (not labeled) through which is received the shaft 166b of the threaded stud 166. An inner surface (e.g. lower) surface of the base portion 164a engages the first free end 143b and the second free end 143c of the body member 140, so as to uniformly drive the first free end 143b and the second free end 143c into the wedge member 162 as described above. An outer surface (e.g., upper surface) of the base portion 164a is engaged by the nut 168. The flanges 164b extend outward and downward from sides of the base portion 164a. The flanges 164b of the spacer member 164 are received within the gaps 162g formed between the two flange portions 162f of the wedge member 162, so as to prevent rotation of the spacer member 164 relative to the wedge member 162 (e.g., as the nut 168 is tightened on the threaded stud 166). The flanges 164b may have a width that is less than that of the base portion 164a, the widths being measured in a direction from the axis of the shaft 166b toward an axis of the battery post 12. The spacer member 164b is elongated (i.e., having a length that is greater than its width), so as to span entirely across a cooperative width of the free ends 143b, 143c of the body member 140 (e.g., the base portion 164a alone or in conjunction with the two flanges 164b). The spacer member 164 thereby engages and presses the free ends 143b, 143c, which provides for significantly smaller packaging than if the free ends 143b, 143c were instead directly engaged by a nut that spanned the cooperative width of the free ends 143b, 143c (i.e., the front-to-back length of the terminal assembly 100 would be longer due to the diameter of the resultant nut).

When the flanges 164b of the spacer member 164 are received in the gaps 162g between the flange portions 162f of the wedge member 162, the spacer member 164 and the wedge member 162 cooperatively circumscribe the first and second free ends 143b, 143c of the body member 140. Moreover, the threaded stud 166 and the nut 168 may be cooperatively configured to prevent the nut 168 from moving to an axial position in which the spacer member 164 and the wedge member 162 do not cooperatively circumscribe the first and second free ends 143b, 143c of the body member 140 (e.g., by having deformed threads on the shaft 166b). The threaded stud 166 may be staked (e.g., have deformed threads), so as to prevent unintentional removal of the nut 168 from the threaded stud 166, such as during shipment of the terminal assembly 100 and/or prior to assembly of a vehicle (e.g., during which the terminal assembly is coupled to the post 12 of the battery 10). Staking of the stud 166 may still allow for intentional removal of the nut 168 for replacement thereof and reuse of the stud 166.

The arrangement of the body member 140 and the coupling mechanism 160 described herein advantageously provides high and durable holding strength. For example, while a specification may provide for a rotational holding force of 12 N-m, testing has shown such a holding force to be maintained over 50 cycles of the battery post terminal assembly 100 being re-tightened to battery posts 12 of specified sizes of 19.5 mm (positive post) and 17.9 mm (negative post).

The lead attachment portion 130 is cooperatively formed by the body member 140 and the lead attachment post 180. The lead attachment portion 130 is positioned substantially opposite the drive portion 120 relative to the battery attachment portion 110. The lead attachment portion 130 is configured to couple to the electrical lead 14, for example, to supply power to a system of a passenger vehicle, other vehicle, or other application. The lead attachment post 180 may, for example, be formed of steel (e.g., a plated steel, such as with tin plating).

More particularly, the lead attachment post 180 is coupled to and protrudes from the body member 140 (e.g., vertically and/or in parallel with the battery post 12 and/or the post 166). The lead attachment post 180 generally includes a head 180a (e.g., base) and a threaded shaft 180b extending upward therefrom. The threaded shaft 180b may be provided in different sizes for terminal assemblies 100 configured for battery posts 12 of positive and negative polarity. For example, negative and positive terminal assemblies may include threaded shafts 180b having a M8 and M6 standard bolt configurations, respectively.

The body member 140 is folded around opposing sides of the head 180a, which may be rectilinear and/or planar, to secure the lead attachment post 180 to the body member 140. For example, an upper end segment 142j of the upper portion 142 of the body member 140 includes flanges 142k (e.g., tabs) that are folded around the opposing sides of the head 180a and engage an underside thereof. A lower end segment 144j of the lower portion 144 of the body member 140 includes opposing flanges 144k that engage the opposing vertical sides of the head 180a of the lead attachment post 180 and/or form a recess in which the head 180a of the lead attachment post 180 is received. An underside of the lower end segment 144j engages an upper side of the head 180a, such that the head 180a is held or compressed between the underside of the lower end segment 144j and the flanges 142k of the upper end segment 142j.

The upper end segment 142j and the lower end segment 144j of the upper portion 142 and the lower portion 144 of the body member may be considered to cooperatively form an end segment 143j (e.g., joined or unitary end) of the body member 140. The end segment 143j may be substantially planar (e.g., with the upper end segment 142j and/or the lower end segment 144j being planar) and/or horizontal. An underside of the upper end segment 142j may directly engage an upper side of the lower end segment 144j. The end segment 143j may additionally include folded segments 143k, which interconnect the upper portion 142 and the lower portion 144 of the body member 140 (e.g., such that the body member 140 is a unitary, single-piece component).

The end segment 143j of the body member 140 is positioned vertically between the upper segment 142h and the lower segment 144h of the upper and lower bands 142a, 144a. The upper end segment 142j and the lower end segment 144j may include substantially vertical segments between the upper and lower apertures 142e, 144e and the clamp mechanism 160, which may also function to prevent rotation of the electrical lead 14 relative to the terminal assembly 100 (e.g., if the electrical lead 14 includes a complementary flat end).

The end segment 143j may additionally include an upper protrusion 143m (e.g., formed in the upper end segment 142j) that is positioned opposite the drive portion battery post 12. The upper protrusion 143m may, for example, engage a surface or mating feature of the electrical lead 14 to prevent relative rotation therebetween. The upper protrusion 143m may, for example, be positioned between the folded segments 143k.

In some applications, the end segment 143j may not be coated, so as to provide bare-to-bare metal contact with a lead attachment, while remaining portions of the body member 140 are plated (e.g., tin-plated, as referenced above).

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

EMBODIMENTS

1. A battery post terminal assembly comprising:

a conductive band having a first free end and a second free end, wherein the conductive band defines an aperture for receiving a battery post of a battery; and a clamp mechanism having a wedge member that defines a recess between a first surface and a second surface thereof, wherein the recess has an open end and a closed end that is narrower than the open end, and the first surface is convex;

wherein the first free end and the second free end are positioned in the recess, and the first free end is movable along the first surface toward the closed end to be moved by the first surface toward the second free end to tighten the conductive band around the battery post.

2. The battery post terminal assembly according to embodiment 1, comprising a body member that forms the conductive band as an upper band and that also forms a lower band spaced below the upper band, wherein first sides of the upper band and the lower band are coupled together to form the first free end, second sides of the upper band and the lower band are coupled together to form the second free end, and the first free end and the second free end are substantially planar;

wherein the recess is further defined between a third surface and a fourth surface of the wedge member that are spaced apart from the first surface and the second surface; and wherein the first surface, the second surface, the third surface, and the fourth surface each engage one the first free end or the second free end and have a convex profile with an upper portion that extends straight and a lower portion that extends straight at a steeper angle than the upper portion.

3. The battery post terminal assembly according to embodiment 1, wherein the second surface is convex.

4. The battery post terminal assembly according to embodiment 3, wherein the recess is further defined between a third surface and a fourth surface of the wedge member, the third surface and the fourth surface being convex; and wherein the first free end engages the first surface and the third surface, and the second free end engages the second surface and the fourth surface.

5. The battery post terminal assembly according to embodiment 4, wherein the wedge member is a unitary component that includes a base, a first flange extending from the base, and a second flange extending from the base parallel with and spaced apart from the first flange, wherein the first flange forms the first surface and the second surface, and the second flange forms the third surface and the fourth surface.

6. The battery post terminal assembly according to embodiment 5, wherein the clamp mechanism further comprises a spacer member that presses the first free end and the second free end into the recess toward the closed end, the spacer member sliding within a gap formed between the first flange and the second flange of the wedge member.

7. The battery post terminal assembly according to embodiment 6, wherein the spacer member and the wedge member circumscribe the first free end and the second free end.

8. The battery post terminal assembly according to embodiment 1 or any of embodiments 2-7, wherein the first surface includes an upper portion adjacent the open end and a lower portion adjacent the closed end, wherein the upper portion extends straight and the lower portion extends straight at a steeper angle than the upper portion.

9. The battery post terminal assembly according to embodiment 1 or any of embodiments 2-8, wherein the first free end and the second free end are substantially planar.

10. The battery post terminal assembly according to embodiment 9, wherein the first free end and the second free end are nominally horizontal.

11. The battery post terminal assembly according to embodiment 1 or any of embodiments 2-10, comprising a body member that forms the conductive band as an upper band and that forms a lower band spaced below the upper band, wherein first sides of the upper band and the lower band are coupled together to form the first free end, and second sides of the upper band and the lower band are coupled together to form the second free end.

12. The battery post terminal assembly according to embodiment 11, wherein the first side of the lower band is folded around the first side of the upper band and engages the first surface of the wedge member, and the second side of the lower band is folded around the second side of the upper band and engages the second surface of the wedge member.

13. The battery post terminal assembly according to embodiment 1 or any of embodiments 2-12, further comprising a lead attachment post coupled to the conductive band and positioned generally opposite the clamping mechanism.

14. The battery post terminal assembly according to embodiment 13 comprising a body member that forms the conductive band, wherein the lead attachment post includes a base and a threaded shaft, the body member being folded around the base and the threaded shaft protruding through the base.

15. A battery post terminal assembly comprising:
a conductive member forming an aperture to receive a battery post of a battery and having a first free end and a second free end spaced apart by a gap; and
a coupling mechanism having a wedge member, a threaded post coupled to the wedge member, a nut threadably attached to the threaded post, and a spacer member slidably received on the threaded post, wherein the wedge member defines a sloped recess in which the first free end and the second free end of the conductive member are received;
wherein the spacer member is drivable by the nut along the threaded post to press the first free end and the free second end of the conductive member into the sloped recess to reduce the gap, and the spacer member is permitted to tilt relative to the threaded post.

16. The battery post terminal assembly according to embodiment 15, wherein the wedge member and the spacer member cooperatively circumscribe the first free and the second free end of the conductive member.

17. The battery post terminal assembly according to embodiment 15 or 16, wherein the wedge member includes two flanges that define the recess and that extend parallel to each other to define a slot, and the spacer member slides within the slot and is prevented from rotating by the two flanges when driven by the nut.

18. The battery post terminal assembly according to embodiment 17, wherein the first free end and the second free end include protrusions that slide within the slot between the two flanges of the wedge member.

19. The battery post terminal assembly according to embodiment 15 or any of embodiments 16-18, further comprising a lead attachment post coupled to the conductive member.

20. A battery post terminal assembly comprising:
a battery post attachment portion tightenable around a battery post of a battery;
a drive portion that tightens the battery post attachment portion using a U-shaped wedge member having convex surfaces that face each other and a tiltable drive member; and
a lead attachment portion coupled to the battery post attachment portion and connectable to an electrical lead.

What is claimed is:

1. A battery post terminal assembly comprising:
a conductive band having a first free end and a second free end, wherein the conductive band defines an aperture for receiving a battery post of a battery; and
a clamp mechanism having a wedge member, a threaded post coupled to the wedge member, a spacer member slidably received on the wedge member, and a nut;
wherein the wedge member defines a recess between a first surface and a second surface thereof;
wherein the first free end and the second free end are positioned in the recess, and the first free end is movable along the first surface into the recess to be moved by the first surface toward the second free end to tighten the conductive band around the battery post; and
wherein the spacer member is elongated so as to span entirely across a cooperative width of the first free end and the second free end, and the spacer member is drivable by the nut along the threaded post to press the first free end and the free second end of the conductive band into the recess to reduce a gap between the first free end and the second free end.

2. The battery post terminal assembly according to claim 1, wherein the recess has an open end and a closed end that is narrower than the open end, the first surface is convex, and the first free end is movable along the first surface toward the closed end to be moved by the first surface toward the second free end to tighten the conductive band around the battery post.

3. The battery post terminal assembly according to claim 2, wherein the second surface is convex.

4. The battery post terminal assembly according to claim 3, wherein the first surface includes an upper portion adjacent the open end and a lower portion adjacent the closed end, wherein the upper portion extends straight and the lower portion extends straight at a steeper angle than the upper portion.

5. The battery post terminal assembly according to claim 1, wherein the recess is further defined between a third surface and a fourth surface of the wedge member.

6. The battery post terminal assembly according to claim 5, wherein the third surface and the fourth surface are convex; and
wherein the first free end engages the first surface and the third surface, and the second free end engages the second surface and the fourth surface.

7. The battery post terminal assembly according to claim 5, wherein the wedge member is a unitary component that includes a base, a first flange extending from the base, and a second flange extending from the base parallel with and spaced apart from the first flange, wherein the first flange forms the first surface and the second surface, and the second flange forms the third surface and the fourth surface.

8. The battery post terminal assembly according to claim 7, wherein the spacer member slides within a gap formed between the first flange and the second flange of the wedge member and is prevented from rotating by the first flange and the second flange.

9. The battery post terminal assembly according to claim 8, wherein the first free end and the second free end include protrusions that slide within the gap between the first flange and the second flange of the wedge member.

10. The battery post terminal assembly according to claim 1, wherein the recess of the wedge member is a sloped recess.

11. The battery post terminal assembly according to claim 1, comprising a body member that forms the conductive band as an upper band and that forms a lower band spaced below the upper band, wherein first sides of the upper band and the lower band are coupled together to form the first free end, and second sides of the upper band and the lower band are coupled together to form the second free end.

12. The battery post terminal assembly according to claim 11, wherein the first side of the lower band is folded around the first side of the upper band and engages the first surface of the wedge member, and the second side of the lower band is folded around the second side of the upper band and engages the second surface of the wedge member.

13. The battery post terminal assembly according to claim 1, further comprising a lead attachment post coupled to the conductive band and positioned generally opposite the clamp mechanism.

14. A battery post terminal assembly comprising:
a conductive band having a first free end and a second free end, wherein the conductive band defines an aperture for receiving a battery post of a battery; and
a clamp mechanism having a wedge member, a threaded post coupled to the wedge member, a spacer member spacer member slidably received on the threaded post, and a nut threadably received on the threaded post;
wherein the spacer member is elongated so as to span entirely across a cooperative width of the first free end and the second free end, and the spacer member is slidable received on the threaded post;
wherein the wedge member defines a recess between a first surface and a second surface thereof, wherein the recess has an open end and a closed end that is narrower than the open end, and the first surface is convex; and
wherein the first free end and the second free end are positioned in the recess, the first free end is movable along the first surface toward the closed end to be moved by the first surface toward the second free end to tighten the conductive band around the battery post, and the spacer member is drivable by the nut along the threaded post to press the first free end and the second free end of the conductive band into the recess to reduce a gap between the first free end and the second free end.

15. A battery post terminal assembly comprising:
a conductive member forming an aperture to receive a battery post of a battery and having a first free end and a second free end spaced apart by a gap; and
a coupling mechanism having a wedge member, a threaded post coupled to the wedge member, a nut threadably attached to the threaded post, and a spacer member slidably received on the threaded post, wherein the wedge member defines a sloped recess in which the first free end and the second free end of the conductive member are received, and the spacer member is elongated so as to span entirely across a cooperative width of the first free end and the second free end;
wherein the spacer member is drivable by the nut along the threaded post to press the first free end and the second free end of the conductive member into the sloped recess to reduce the gap, and the spacer member is permitted to tilt relative to the threaded post.

16. The battery post terminal assembly according to claim 4, wherein the spacer member slidably is permitted to tilt relative to the threaded post.

17. The battery post terminal assembly according to claim 16, wherein the recess is further defined between a third surface and a fourth surface of the wedge member, the third surface and the fourth surface are convex, the first free end engages the first surface and the third surface, and the second free end engages the second surface and the fourth surface;
wherein the wedge member is a unitary component that includes a base, a first flange extending from the base, and a second flange extending from the base parallel with and spaced apart from the first flange, wherein the first flange forms the first surface and the second surface, and the second flange forms the third surface and the fourth surface; and
wherein the spacer member slides within a gap formed between the first flange and the second flange of the wedge member and is prevented from rotating by the first flange and the second flange.

18. The battery post terminal assembly according to claim 14, wherein the spacer member is permitted to tilt relative to the threaded post.

19. The battery post terminal assembly according to claim 15, wherein the wedge member includes a first surface and a second surface that define the sloped recess and are convex.

20. The battery post terminal assembly according to claim 4, wherein the lower portion extends straight at the steeper angle with a greater angle of inclination than the upper portion, the angle of inclination being measured relative to the threaded post.

* * * * *